(12) United States Patent
Masumura et al.

(10) Patent No.: US 11,303,879 B2
(45) Date of Patent: Apr. 12, 2022

(54) DISPLAY DEVICE

(71) Applicant: Tianma Japan, Ltd., Kanagawa (JP)

(72) Inventors: Kazunori Masumura, Kanagawa (JP); Tetsushi Sato, Kanagawa (JP)

(73) Assignees: WUHAN TIANMA MICRO-ELECTRONICS CO., LTD., Wuhan (CN); TIANMA JAPAN, LTD., Kanagawa (JP)

( * ) Notice: Subject to any disclaimer, the term of this patent is extended or adjusted under 35 U.S.C. 154(b) by 0 days.

(21) Appl. No.: 16/859,542

(22) Filed: Apr. 27, 2020

(65) Prior Publication Data

US 2020/0344461 A1 Oct. 29, 2020

(30) Foreign Application Priority Data

Apr. 26, 2019 (JP) .............................. JP2019-086016

(51) Int. Cl.
| | |
|---|---|
| *G02B 30/56* | (2020.01) |
| *G02B 30/27* | (2020.01) |
| *G02B 30/32* | (2020.01) |
| *H04N 13/322* | (2018.01) |
| *H04N 13/302* | (2018.01) |
| *H04N 13/305* | (2018.01) |

(52) U.S. Cl.
CPC .......... *H04N 13/322* (2018.05); *G02B 30/56* (2020.01)

(58) Field of Classification Search
USPC .......................................................... 348/51
See application file for complete search history.

(56) References Cited

U.S. PATENT DOCUMENTS

| | | | |
|---|---|---|---|
| 8,139,223 B2 | 3/2012 | Maekawa | |
| 2008/0218854 A1* | 9/2008 | Hoshino | ................ G02B 30/35 359/462 |
| 2010/0128271 A1 | 5/2010 | Maekawa | |

FOREIGN PATENT DOCUMENTS

| | | |
|---|---|---|
| JP | 2011/081309 A | 4/2011 |
| WO | 2008/123473 A1 | 10/2008 |

* cited by examiner

*Primary Examiner* — Patricia I Young
(74) *Attorney, Agent, or Firm* — Nixon & Vanderhye (57) ABSTRACT

A display device, including: an optical system including an aerial imaging element, and a reflective member having a mirror surface that reflects light, wherein the reflective member is arranged so as to reflect first entering light to emit to the aerial imaging element as second entering light, the first entering light is emitted from a projected object and is reflected by the aerial imaging element, and wherein the aerial imaging element reflects the first entering light so as to form a first real image in a position that is in plane symmetry with the projected object with respect to a plane in which the aerial imaging element is formed; and reflects the second entering light so as to form a second real image in a position that is in plane symmetry with a virtual image of the first real image formed by the reflective member with respect to the plane.

9 Claims, 9 Drawing Sheets

DISPLAY DEVICE

CROSS-REFERENCE TO RELATED APPLICATIONS

This Non-provisional application claims priority under 35 U.S.C. § 119(a) on Patent Application No. 2019-86016 filed in Japan on Apr. 26, 2019, the entire content of which is hereby incorporated by reference.

BACKGROUND

The present disclosure relates to a display device including an optical system that forms an image in the air.

Optical systems disclosed in WO 2008/123473 and JP 2011-81309 A are examples of optical systems that forms an image in the air.

WO 2008/123473 discloses an optical system wherein a plurality of imaging optical systems, which employ specular reflection such that an image of a projected object can be captured as a real image on the side opposite the symmetrical image, are arranged in a line so as to be separate from each other, with at least one of the imaging optical systems including a half mirror and a retroreflecting element that is disposed at a position in which transmitted or reflected light from the half mirror is retroreflected.

JP 2011-81309 A discloses that first and second reflective plane symmetry imaging elements made of flat plate structures in which multiple micromirror units are arranged in a matrix are comprised; each of the first and second reflective plane symmetry imaging elements is configured by overlapping first and second aggregates, which have a plurality of long members each having one light reflective surface and being arranged in parallel such that the light reflective surfaces thereof are on the same side, so as to overlap in such a manner that the light reflective surfaces intersect; and the light reflective surfaces of the first aggregate constitute a first light reflective surface of the micromirror unit and the light reflective surfaces of the second aggregate constitute the second reflective surface of the micromirror unit.

The imaging optical system (reflective plane symmetry imaging element) causes light emitted by the projected object that is disposed on one surface side to be specularly reflected two or more times, to form a real image at a position opposite the projected object. There is a problem that a real image of a three-dimensional structure formed through one or another odd number of imaging optical systems exhibits an inversion of protrusions and recesses.

Such inversion of protrusions and recesses is a major problem when forming a three-dimensional image in the air. Specifically, images in which there is no inversion in protrusions and recesses coexist with images in which there is an inversion in protrusions and recesses, and thus, the images are perceived as not having a three-dimensional effect or as unnatural three-dimensional images.

In order to solve this problem, WO 2008/123473 discloses the feature of using an even number of imaging optical systems, and JP 2011-81309 discloses the feature of using two reflective plane symmetry imaging elements. Use of an even number of imaging optical systems (reflective plane symmetry imaging elements) can resolve the issue of inversion of protrusions and recesses in the real image of a three-dimensional structure.

SUMMARY OF THE INVENTION

An aspect of this disclosure is an optical element comprising: a display device comprises an optical system including an aerial imaging element that reflects entering light so as to form a real image aerially, and a reflective member having a mirror surface that reflects light. The reflective member is arranged so as to reflect first entering light to emit to the aerial imaging element as second entering light, the first entering light is emitted from a projected object and is reflected by the aerial imaging element. The aerial imaging element is configured to: reflect the first entering light so as to form a first real image in a position that is in plane symmetry with the projected object with respect to a plane in which the aerial imaging element is formed; and reflect the second entering light so as to form a second real image in a position that is in plane symmetry with a virtual image of the first real image formed by the reflective member with respect to the plane in which the aerial imaging element is formed.

It is to be understood that both the foregoing general description and the following detailed description are exemplary and explanatory and are not restrictive of this disclosure.

DETAILED DESCRIPTION OF EMBODIMENTS

Below, embodiments of the present invention will be explained with reference to figures. In each of the figures, common components are given the same reference characters.

Embodiment 1

Figure 1:
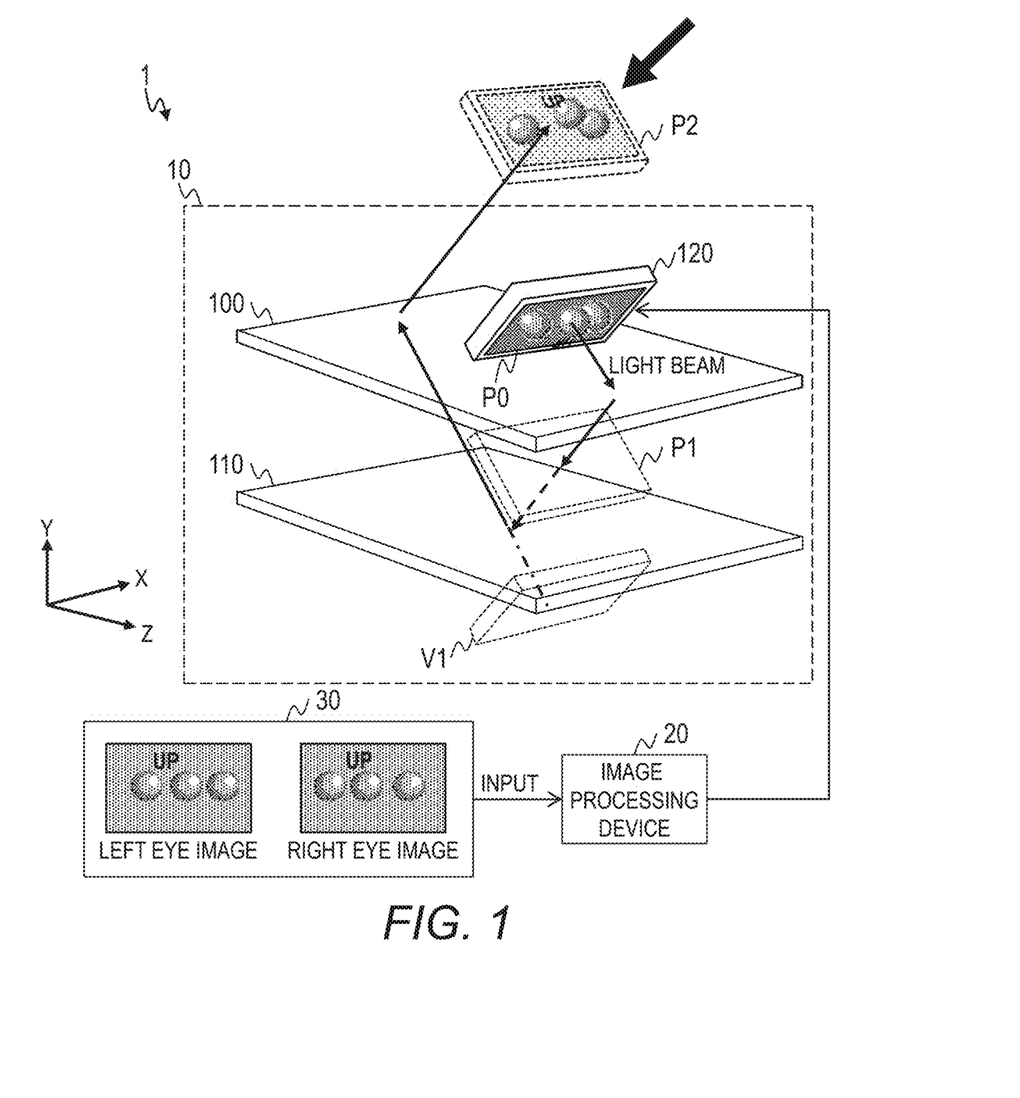
FIG. 1 illustrates an example of a primary configuration of a display device according to Embodiment 1.
Figure 2:
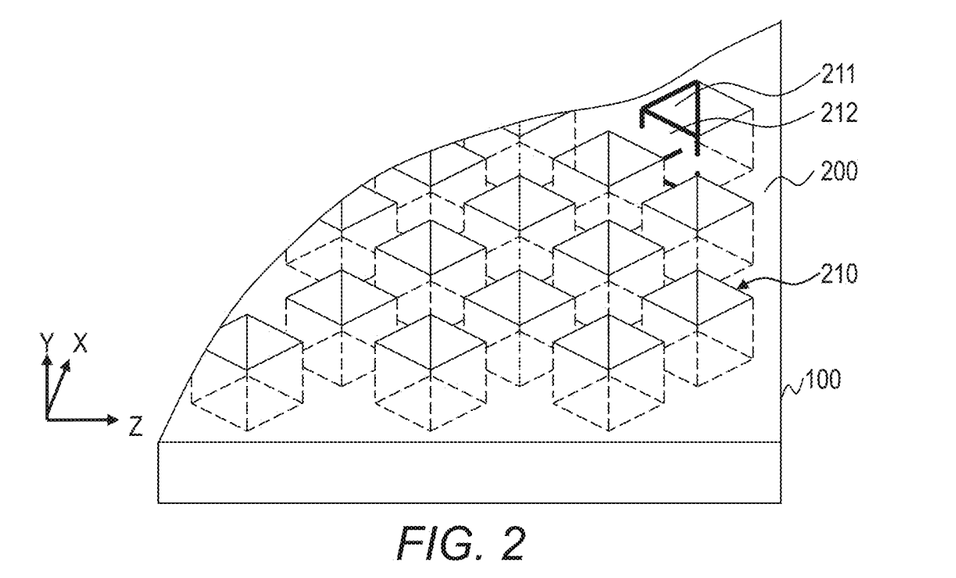
FIG. 2 illustrates an example of a structure of an aerial imaging element according to Embodiment 1.
Figure 3:
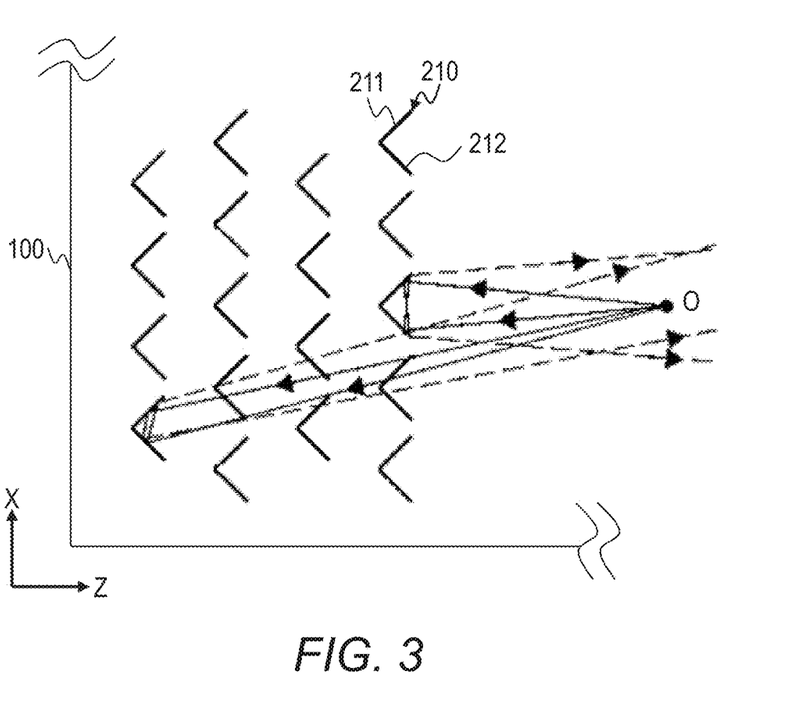
FIGS. 3 and 4 illustrate examples of an imaging style of the aerial imaging element according to Embodiment 1.
Figure 4:
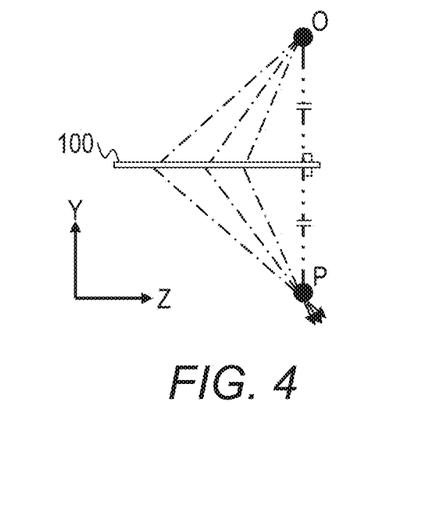
Figure 5:
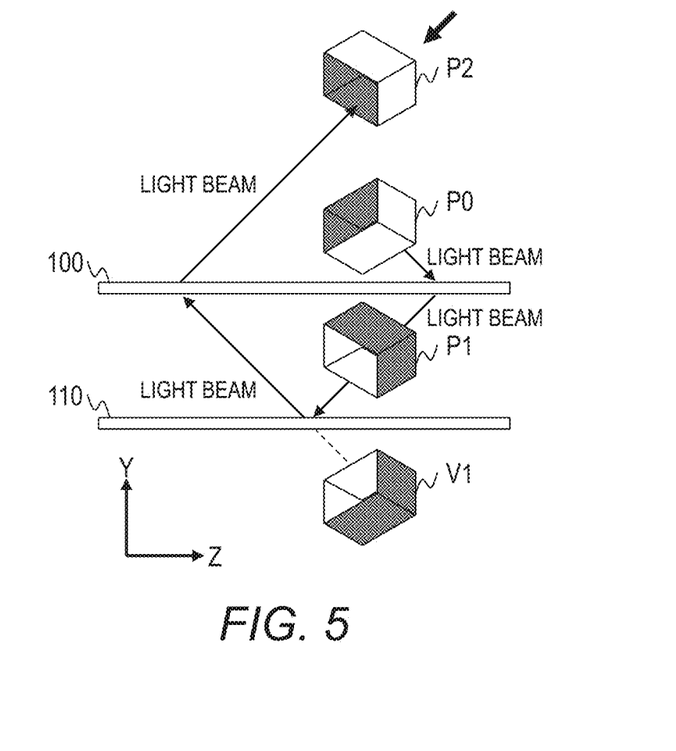
FIG. 5 illustrates an example of an imaging style of an optical system according to Embodiment 1.

FIG. 1 illustrates an example of a primary configuration of a display device 1 according to Embodiment 1. FIG. 2 illustrates an example of a structure of an aerial imaging element 100 according to Embodiment 1. FIGS. 3 and 4 illustrate examples of an imaging style of the aerial imaging element 100 according to Embodiment 1. FIG. 5 illustrates an example of an imaging style of an optical system 10 according to Embodiment 1.

The display device 1 is constituted of the optical system 10 and an image processing device 20.

The image processing device 20 receives input of image data 30 of a three-dimensional projected object, and outputs the image data 30 to a display 120. The image data 30 includes a right eye image and a left eye image. Examples of the image processing device 20 include general use computers having a processor, a memory, and an external interface, miniature computers such as microcomputers, or hardware constituted of a logic circuit and a memory.

Image data 30 of a flat projected image may be inputted into the image processing device 20.

The optical system 10 is constituted of the aerial imaging element 100, a flat mirror 110, and the display 120.

The display 120 of Embodiment 1 displays a three-dimensional image. Examples of display methods for the three-dimensional image include the lenticular lens method, the parallax barrier method, and the like. The present disclosure is not limited to a display method for three-dimensional images.

The aerial imaging element 100 is an element constituted of a plurality of corner reflectors 210 arranged in a given pattern in a substantially flat base 200.

In the description below, the plurality of corner reflectors 210 arranged in a given pattern are sometimes referred to as a corner reflector array. The corner reflectors 210 included in the corner reflector array are formed so as to face the same direction in relation to the base 200.

Each of the corner reflectors 210 has mirror elements 211 and 212 on inner walls of a rectangular cuboid hole formed by cutting the base 200. The mirror elements 211 and 212 are formed by executing a smoothing/mirroring process on the inner walls, for example. In FIG. 2, for ease of explanation, the inner walls forming the mirror elements 211 and 212 of the corner reflectors 210 are depicted with emphasis. The angle between the planes forming the mirror elements 211 and 212 is substantially a right angle.

Among the four inner walls of the hole, it is preferable that the inner walls that do not form the mirror elements 211 and 212 suppress multiply reflected light. Such inner walls are controlled such that the smoothing/mirroring process is not performed thereon, or the angle formed between the inner walls is controlled, for example.

The corner reflectors 210 use the two mirror elements 211 and 212 to reflect entering light in a specific direction. FIG. 3 illustrates the optical paths on the ZX plane of light entering the aerial imaging element 100. Also, FIG. 4 illustrates the optical paths on the YZ plane of light entering the aerial imaging element 100. FIG. 3 represents the optical paths of the light entering the aerial imaging element 100 as solid lines, and represents the optical paths of light emitted from the aerial imaging element 100 as dotted lines.

In a case where a portion of the light emitted randomly from a projected object O enters the corner reflector 210, the light enters one mirror element 211, is reflected by the mirror element 211, and enters another mirror element 212. Additionally, the light is reflected by the other mirror element 212 and is emitted in the direction opposite to the entering direction. In a case where light enters the mirror element 212, the light reflected by the mirror element 212 enters the mirror element 211, is reflected by the mirror element 211, and is emitted in the direction opposite to the entering direction.

FIG. 3 is a schematic view to allow for a simplified explanation. However, the actual corner reflectors 210 are very small, and thus, entered light and emitted light mostly overlap. Thus, as illustrated in FIG. 4, where the optical paths of the aforementioned light are seen on the YZ plane, if the projected object O is arranged on one surface side of the aerial imaging element 100, a portion of the light emitted from the projected object O is reflected twice inside the aerial imaging element 100. Among the light from the projected object O, the light reflected twice passes through a position P that is in plane symmetry with the projected object O in relation to the plane in which the aerial imaging element 100 is formed. Thus, an image of the projected object O is formed as a real image P at the position that is in plane symmetry with the projected object O in relation to the plane in which the aerial imaging element 100 is formed.

As illustrated in FIGS. 3 and 4, the directions of the X component and the Z component of the light emitted from the corner reflectors 210 are opposite to the directions of the X component and the Z component of the entered light. Also, the real image P is an image in which the protrusions and recesses of the projected object O are inverted.

The flat mirror 110 is a substantially flat mirror. In the optical system 10, the flat mirror 110 functions as a reflective member that forms a virtual image by reflecting entered light.

Here, the arrangement of the components of the optical system 10 (aerial imaging element 100, flat mirror 110, and display 120) is described.

The display 120 is arranged such that the display surface of the display 120 is inclined with respect to the plane (YZ plane) in which the aerial imaging element 100 is formed. In the present disclosure, the plane (YZ plane) in which the aerial imaging element 100 is formed is designated as 0 degrees. In a case where the inclination angle of the display surface of the display 120 is 0 degrees, then even if light beams emitted from the display 120 enter the aerial imaging element 100, the light beams are mostly not reflected by the substantially perpendicular mirror elements 211 and 212 that are formed on the plane of the aerial imaging element 100. In a case where the inclination angle of the display surface of the display 120 is 90 degrees, then light beams emitted from the display mostly do not enter the aerial imaging element 100. If the light beams are mostly not reflected by or mostly do not enter the aerial imaging element 100, the image displayed in the display 120 is not formed in a position in plane symmetry with respect to the aerial imaging element 100. Thus, the inclination angle of the display surface of the display 120 should be in a range of greater than 0 degrees and less than 90 degrees. In FIG. 1, the display 120 is arranged at 45 degrees to the plane in which the aerial imaging element 100 is formed.

The flat mirror 110 is arranged so as to be parallel to the plane in which the aerial imaging element 100 is formed. As long as the light emitted from the aerial imaging element 100 can be reflected so as to be able to enter the aerial imaging element 100 again, then the flat mirror 110 may be arranged so as to be inclined with respect to the plane in which the aerial imaging element 100 is formed.

Next, the image displayed by the optical system 10 will be described with reference to FIG. 5.

The light representing a projected object P0 displayed in the display 120 enters the aerial imaging element 100. As a result of the effect of the corner reflector array, the light entering the aerial imaging element 100 forms a real image P1 (first real image) at a position that is in plane symmetry with the projected object P0 in relation to the plane in which the aerial imaging element 100 is formed.

The light forming the real image P1 is reflected by the flat mirror 110, and the reflected light enters the aerial imaging element 100 again. This is equivalent to the light of a virtual image V1 entering the aerial imaging element 100.

As a result of the effect of the corner reflector array, the light emitting from the flat mirror 110 forms a real image P2 (second real image) at a position that is in plane symmetry with the virtual image V1 in relation to the plane in which the aerial imaging element 100 is formed.

Figure 6:
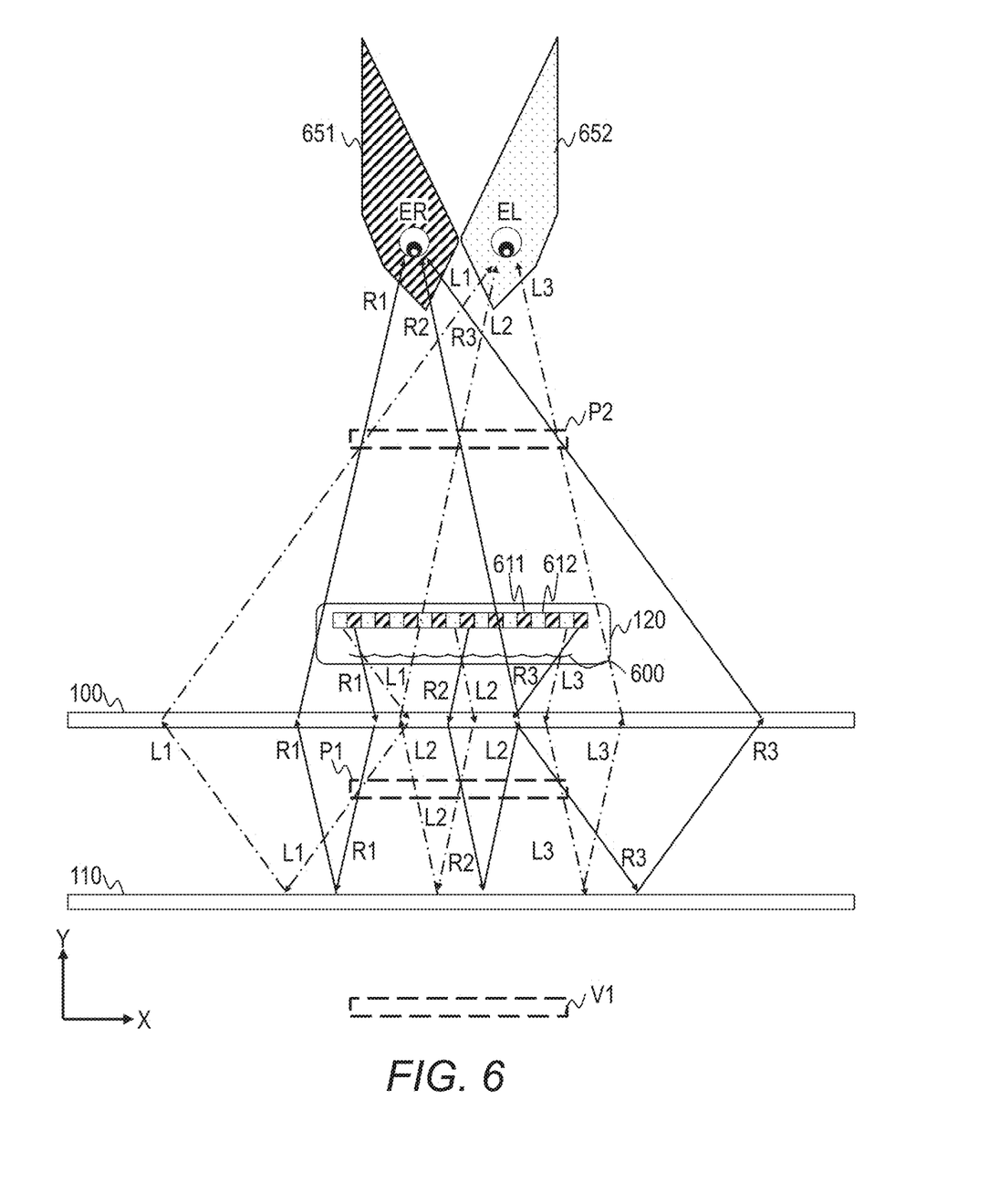
FIG. 6 illustrates an example of an optical model of the optical system according to Embodiment 1.

In this manner, the light emitted from the projected object P0 enters the aerial imaging element 100 twice, and thus, the protrusions and recesses of the real image P2 match the protrusions and recesses of the projected object P0. FIG. 6 illustrates an example of an optical model of the optical system 10 according to Embodiment 1.

The display 120 is constituted of a lenticular lens 600, a plurality of right eye pixels 611, and a plurality of left eye pixels 612.

The lenticular lens 600 is a lens in which semi-cylindrical concave lenses are arranged in a sheet. The concave lenses are cylindrical lenses, for example. The right eye pixels 611, the left eye pixels 612, and the concave lenses are arranged such that each concave lens is associated with a pair of pixels including a right eye pixel 611 and a left eye pixel 612. It may be set a light-shielding unit, which prevents color mixing in the image as well as enables the transmission of signals for displaying the image, between each right eye pixel 611 and left eye pixel 612.

As illustrated in FIG. 1, the display 120 is inclined at 45 degrees to the Y axis, but an optical model that focuses on the pixel array in the X axis direction of the display 120 is illustrated for ease of explanation.

The light emitted from the right eye pixels 611 and the left eye pixels 612 enters the lenticular lens 600. In FIG. 6, the optical paths of the light emitted from the right eye pixels 611 is depicted with solid lines, and the optical paths are labeled with "R". The optical paths of the light emitted from the left eye pixels 612 is depicted with a one-dot-chain line, and the optical paths are labeled with "L".

The light refracted by the lenticular lens 600 enters the aerial imaging element 100, is reflected by effect of the corner reflector array, and is emitted in a direction opposite to the entering direction. The light emitted from aerial imaging element 100 forms a real image P1 at a position that is in plane symmetry with the projected object P0 in relation to the plane in which the aerial imaging element 100 is formed. The light is reflected by the mirror surface of the flat mirror 110, and enters the aerial imaging element 100 again.

The light entering the aerial imaging element 100 is reflected by effect of the corner reflector array, and is emitted in a direction opposite to the entering direction. The light emitted from the aerial imaging element 100 forms the real image P2 at a position that is in plane symmetry with the virtual image V1 in relation to the plane in which the aerial imaging element 100 is formed.

As illustrated in FIG. 6, the light emitted from the plurality of right eye pixels 611 forms a region ER 651 in which a right eye image is visible, and light emitted from the plurality of left eye pixels 612 forms a region EL 652 in which a left eye image is visible.

By the viewer observing the real image P2 by positioning their right eye in a region ER 651 and their left eye in a region EL 652, the viewer can see a three-dimensional image formed in the air.

According to Embodiment 1, the optical system 10 can use one aerial imaging element 100 to form the real image P2 in which the protrusions and recesses match those of the projected object P0. Thus, it is possible to keep manufacturing costs low.

Embodiment 2

In Embodiment 2, an optical system 10 in which the real image P2 can be viewed as an image at a desired orientation is described.

In a case of displaying in the display 120 an image that can be observed with the naked eye and that is in a desired orientation, the real image P2 is seen as an image that is upside down as compared to the projected object P0 due to reflection by the aerial imaging element 100, and is inverted left/right as compared to the projected object P0 due to reflection by the flat mirror 110. In other words, the real image P2 is seen as an image formed by rotating the projected object P0 displayed in the display 120 by 180 degrees and inverting horizontally. The horizontally inverted image represents an image that is inverted about a vertical axis.

In Embodiment 2, an arrangement of the display 120 and image processing for outputting the image data 30 is controlled such that the real image P2 can be viewed as an image at a desired orientation.

Specifically, the display 120 is arranged such that the upper direction of the display 120 faces the aerial imaging element 100. Also, the image processing device 20 executes image processing for generating the image data 30 representing an image obtained by horizontal inversion an image in a desired orientation, and outputs the image data 30 to the display 120.

A similar type of display may be performed only through image processing without changing the orientation of the display 120. In this case, the image processing device 20 executes image processing for generating image data 30 representing an image obtained by rotating the real image P2 by 180 degrees and by horizontal inversion.

According to Embodiment 2, it is possible to realize an optical system 10 that can display the real image P2 at a desired orientation with respect to the viewer.

Embodiment 3

In Embodiment 3, an optical system 10 that forms a real image P2 that can be seen as an image at a desired orientation without controlling the image processing for outputting the image data 30 is described.

Figure 7:
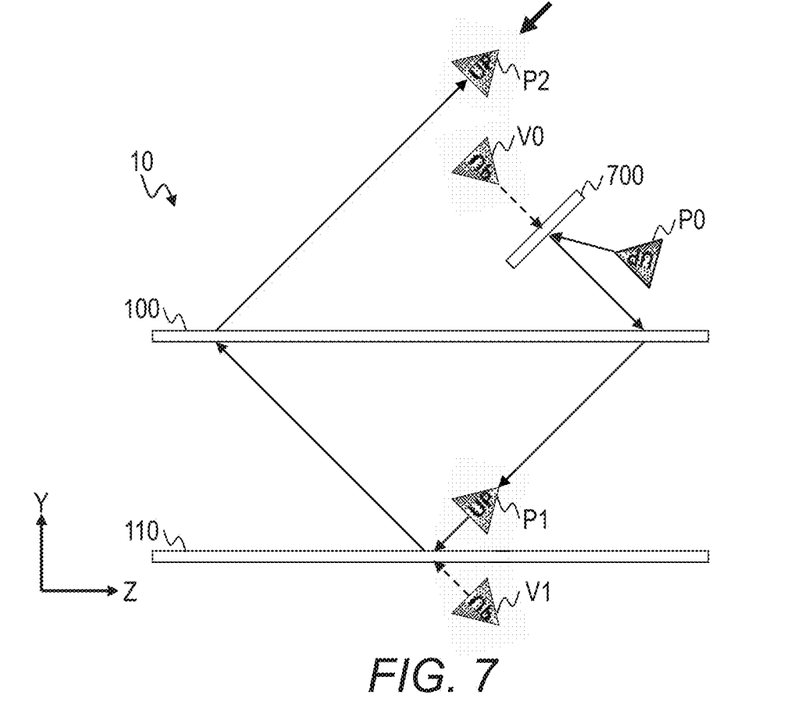
FIG. 7 illustrates an example of the structure of the optical system according to Embodiment 3.

FIG. 7 illustrates an example of the structure of an optical system 10 according to Embodiment 3.

The optical system 10 of Embodiment 3, as a new configuration, includes a flat mirror 700. The flat mirror 700 is arranged such that the reflected light of a projected object P0 enters the aerial imaging element 100. Specifically, the flat mirror 700 is arranged so as to have an inclination of 45 degrees to the plane in which the aerial imaging element 100 is formed.

Also, in Embodiment 3, the display 120 is arranged such that the upper direction of the display 120 faces the aerial imaging element 100. Light that is upside down in relation to the projected object P0 is emitted to the flat mirror 700.

In the optical system 10 of Embodiment 3, specular reflection occurs twice, and thus, there is no need for an imaging process for horizontal inversion.

According to Embodiment 3, it is possible to realize an optical system 10 that can display the real image P2 at a desired orientation with respect to the viewer without performing image processing. The optical system 10 of Embodiment 3 can also be applied to a device that projects the real image P2 of a three-dimensional object. Specifically, the three-dimensional object would replace the display 120.

In a case where the three-dimensional object does not emit light, then a lighting device that illuminates the three-dimensional object can be installed in the optical system 10 as appropriate.

Embodiment 4

In Embodiment 4, a configuration of a display device 1 for forming a clearly visible real image P2 is described.

FIGS. 8A, 8B, 9A, and 9B illustrate an example of a case that accommodates an optical system 10 according to Embodiment 4.

Figure 8A:
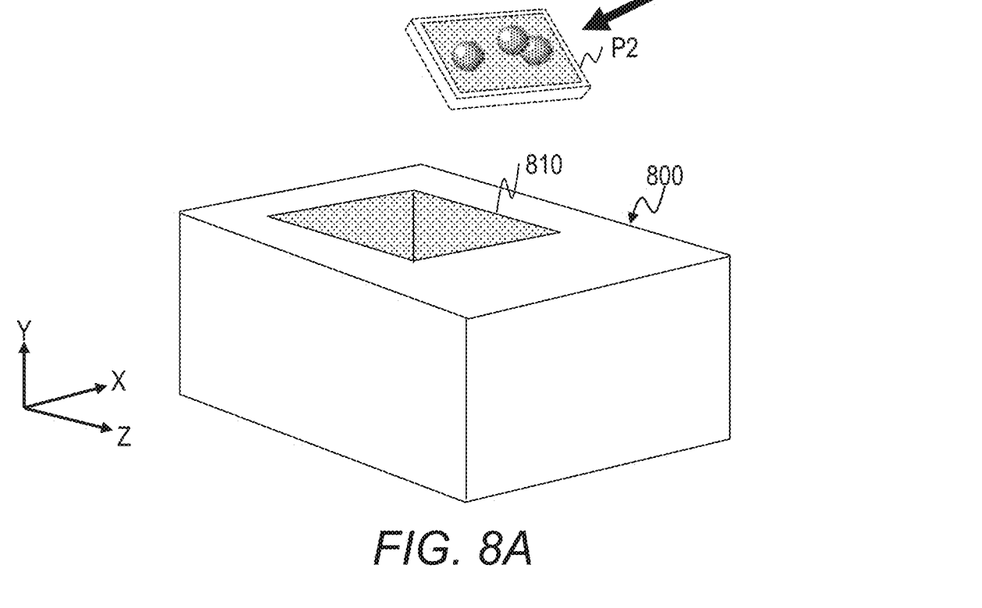
FIGS. 8A, 8B, 9A, and 9B illustrate an example of a case that accommodates the optical system according to Embodiment 4.
Figure 8B:
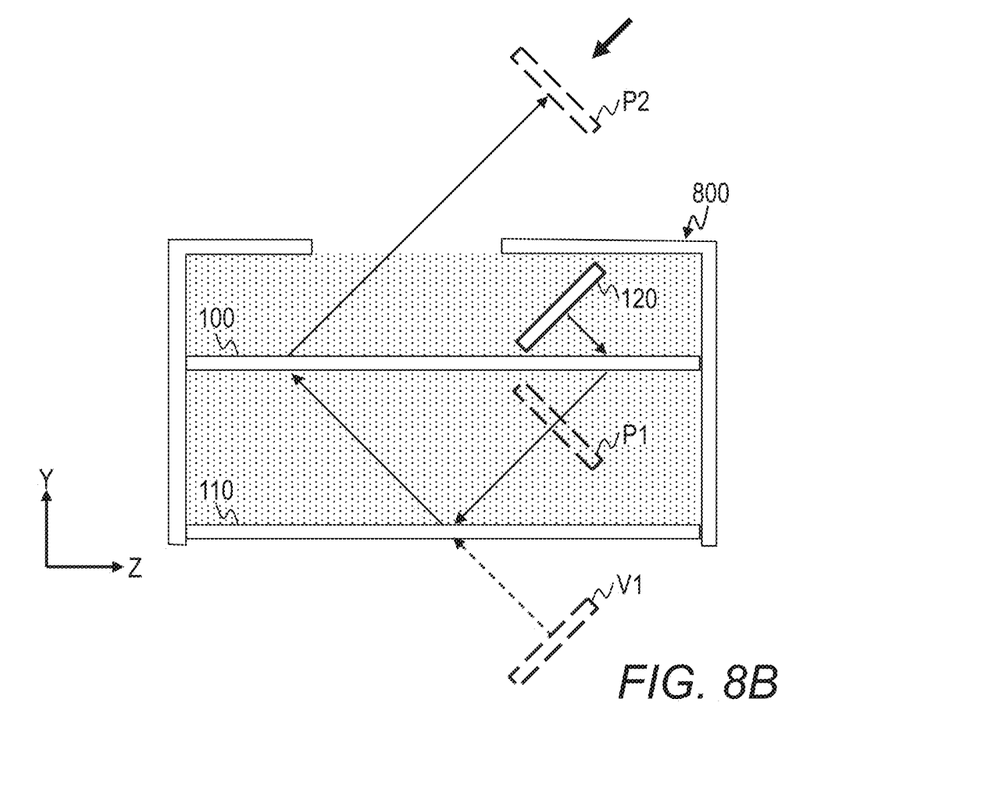

FIGS. 8A and 8B illustrate the optical system 10 accommodated in a case 800 having an opening 810. The image processing device 20 may also be accommodated in the case 800.

The aerial imaging element 100, the flat mirror 110, and the display 120 are accommodated inside the case 800. Light emitted from the opening 810 is formed into a real image P2 in the air.

Figure 9A:
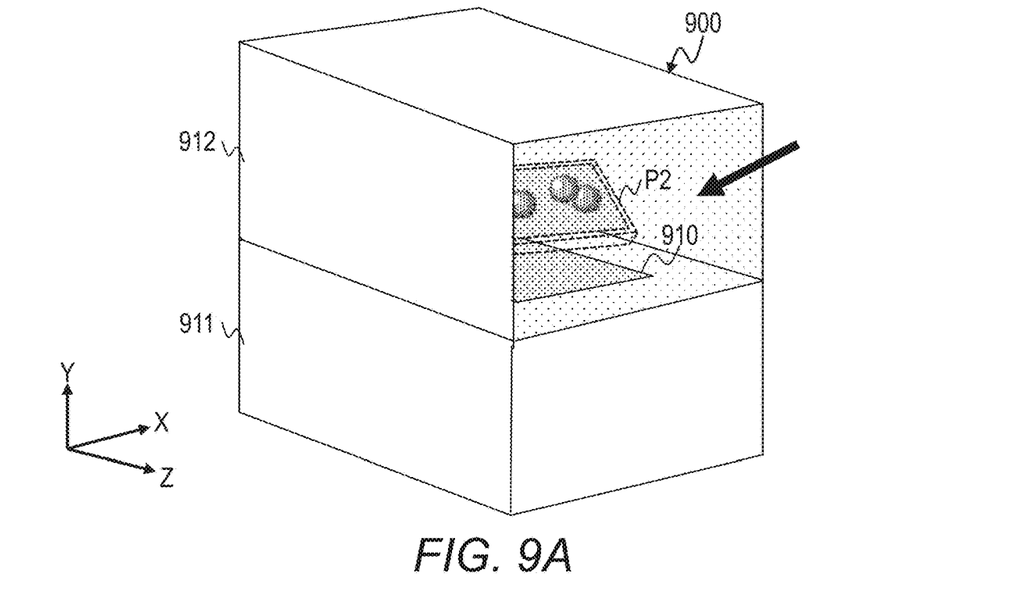
Figure 9B:
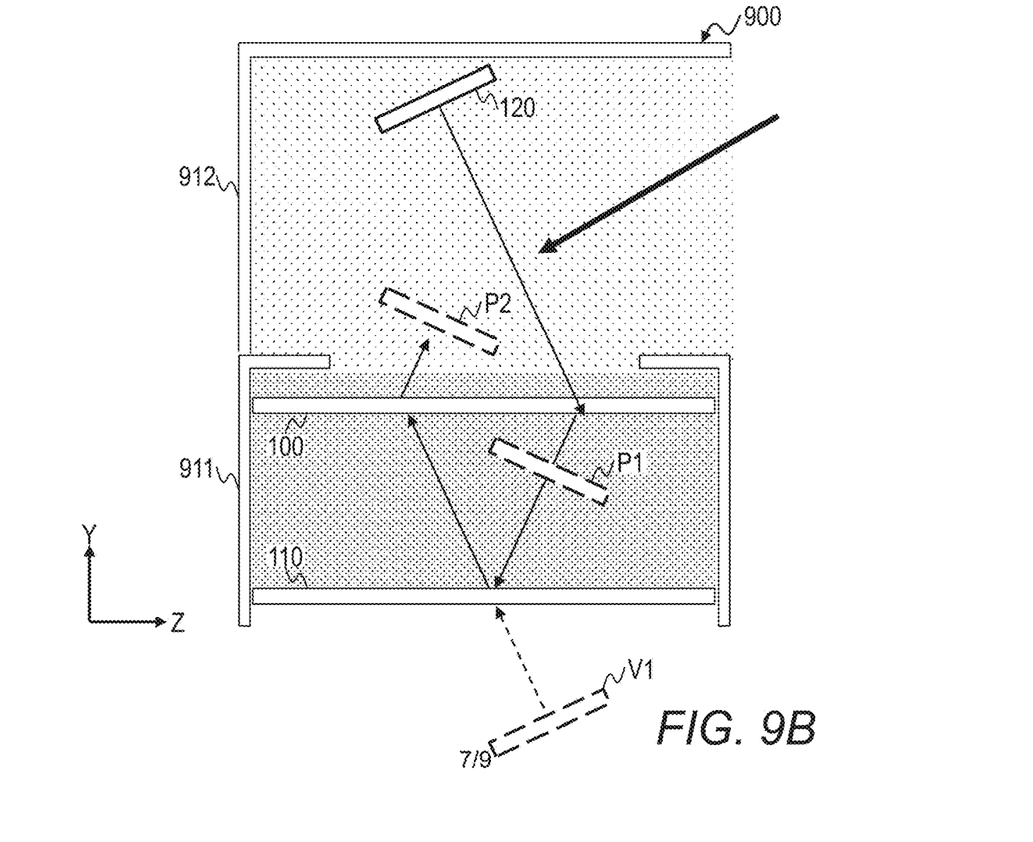

FIGS. 9A and 9B illustrate the optical system 10 accommodated in a case 900 having an opening 910 covered by a cover. The image processing device 20 may also be accommodated in the case 900.

The case 900 is constituted of a case portion 911 having the opening 910, and a case portion 912 forming the cover that covers the opening 910. Also, the display 120 is arranged above the real image P2, or in other words, on the upper edge of the case portion 912. The viewer views light (real image P2) emitted from the opening 910 of the case portion 912.

By accommodating the optical system 10 in the case as illustrated in FIGS. 8A and 9A, it is possible to conceal from the viewer the light reflected off of the surface of the aerial imaging element 100, a virtual image formed as a result of stray light, a virtual image appearing in the flat mirror 110, or the like. In other words, it is possible to minimize the effect of lights and images on the visibility of the real image P2.

As a result, it is possible to improve the contrast of the real image P2, enabling the viewer to concentrate on viewing the real image P2. In other words, it is possible to improve the visibility of the real image P2.

Embodiment 5

In Embodiment 5, the positional relationship between components of the optical system 10 is adjusted in order for the viewer to see a real image P2 clearly.

Figure 10:
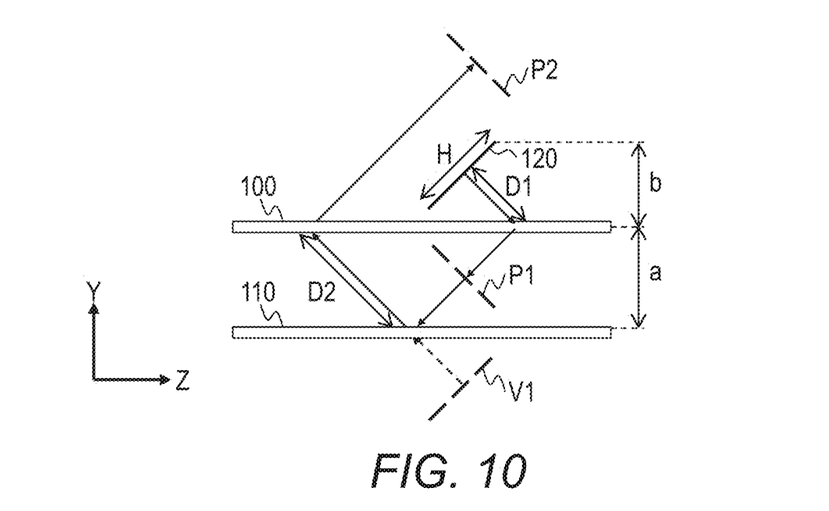
FIG. 10 illustrates the relationship between the positions and sizes of the components of the optical system according to Embodiment 5.
Figure 11A:
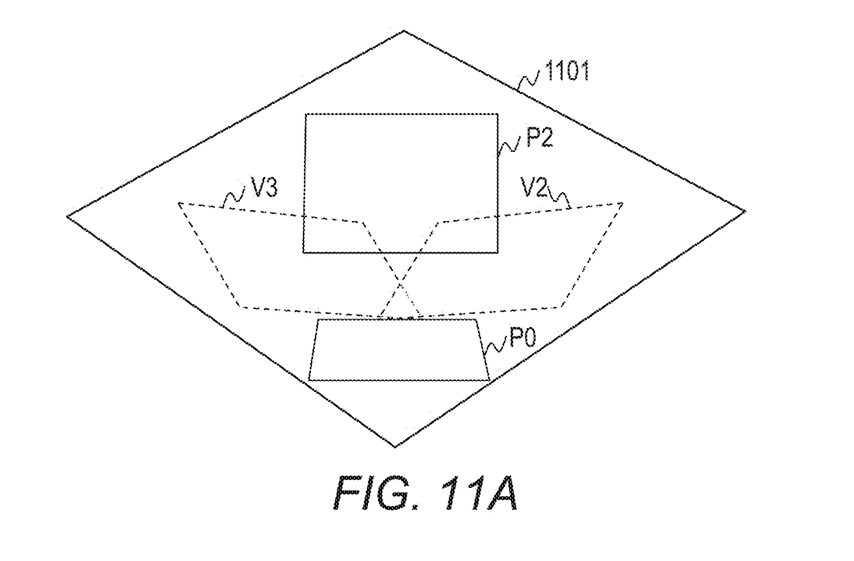
FIGS. 11A and 11B illustrate an example of an image displayed by the optical system according to Embodiment 5.
Figure 11B:
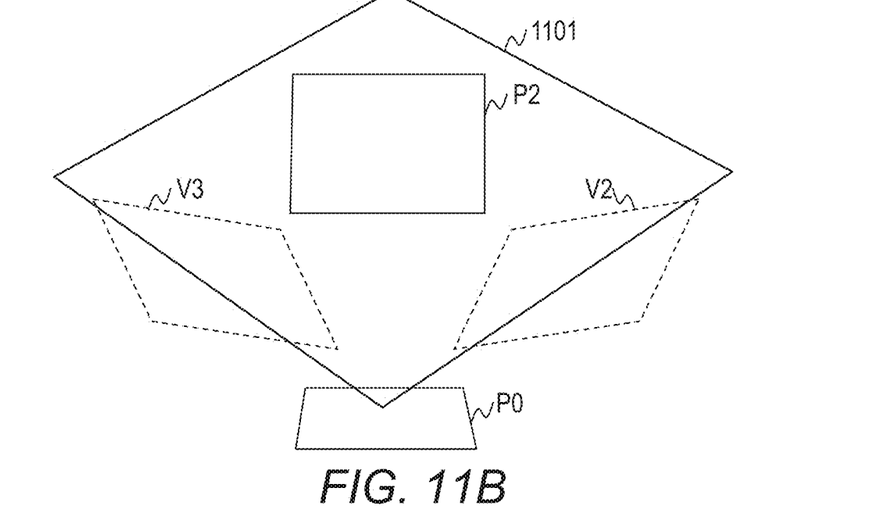

FIG. 10 illustrates the relationship between the positions and sizes of the components of the optical system 10 according to Embodiment 5. FIGS. 11A and 11B illustrate an example of an image displayed by the optical system 10 according to Embodiment 5.

In a case where the distance between the aerial imaging element 100 and the display 120 and the distance between the aerial imaging element 100 and the flat mirror 110 are not appropriately adjusted, then as illustrated in FIG. 11A, the viewer may see the real image P2 with overlapping the projected object P0 and the virtual images V2 and V3. The rectangle 1101 is a region that schematically illustrates the user's vision when viewing the optical system 10.

In Embodiment 5, as illustrated in FIG. 11B, the positional relationship between the components of the optical system 10 in order to display the real image P2 such that the real image P2 does not overlap the projected object P0 and the virtual images V2 and V3 is described.

Here, the size (height) of the display 120 in the YZ plane is H, the distance that the light emitted from the center of the display 120 travels until it reaches the aerial imaging element 100 is D1, and the distance that the light reflected by the flat mirror 110 travels until it reaches the aerial imaging element 100 is D2. Also, the distance in the Z axis direction between the aerial imaging element 100 and the flat mirror 110 is a, and the maximum distance in the Z axis direction between the aerial imaging element 100 and the display 120 is b.

An experiment was performed regarding the overlap of virtual images, for a scenario in which the viewer sees the real image P2 from a 45-degree angle in relation to the plane in which the aerial imaging element 100 is formed. The distance between the real image P2 and the eyes of the viewer was set to a range of 500 mm to 750 mm.

The experiment revealed that by adjusting the arrangement of the components of the optical system 10 such that D2 is four or more times D1, it is possible to display the real image P2 which does not overlap the projected object P0 and the virtual images V2 and V3. Also, it was found that it is preferable that D1 be two or more times H. Thus, it was found that by adjusting H, D1, and D2, it is possible to display the real image P2 which does not overlap the projected object P0 and the virtual images V2 and V3.

Specific and optimal values for H, D1, and D2 are determined according to the distance between the real image P2 and the eyes of the viewer, the viewing angle when viewing the real image P2, and the like.

Figure 12:
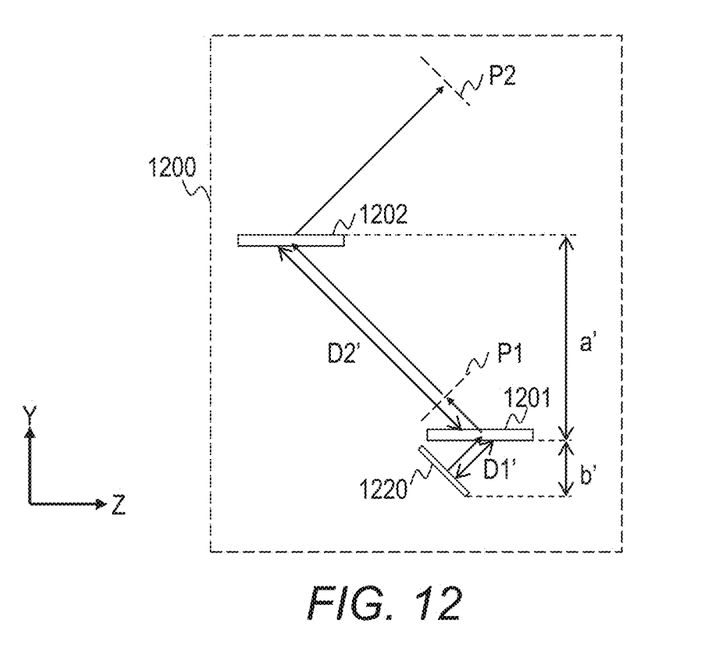
FIG. 12 illustrates an example of an arrangement of components of a conventional optical system.

FIG. 12 illustrates an example of the configuration and arrangement of a conventional optical system 1200. For comparison with the optical system 10 of the present disclosure, an arrangement example of the components of the optical system 1200 disclosed in WO 2008/123473 is illustrated.

Here, the distance in the Z axis direction between the aerial imaging elements 1201 and 1202 is a', and the maximum distance in the Z axis direction between the aerial imaging element 1201 and the display 1220 is b'.

If b' is set to be equal to b, it was found that in order to display the real image P2 as illustrated in FIG. 11B, a' would need to be approximately double a.

Thus, the optical system 10 of the present disclosure can be miniaturized to a greater degree than a conventional optical system. Therefore, it is also possible to miniaturize the case that accommodates the optical system 10.

As set forth above, embodiments of this invention have been described; however, this invention is not limited to the foregoing embodiments. Those skilled in the art can easily modify, add, or convert each element in the foregoing embodiment within the scope of this invention. A part of the configuration of one embodiment can be replaced with a configuration of another embodiment or a configuration of an embodiment can be incorporated into a configuration of another embodiment.

What is claimed is:

1. A display device, comprising:
   an optical system, including
   an aerial imaging element comprised of a plurality of elements that each have two reflecting surfaces orthogonal with one another, said plurality of elements arranged in an array that extends along a plane, said plane being non-parallel to respective planes of the two reflecting surfaces, and
   a reflective member having a mirror surface arranged with respect to the aerial imaging element to reflect light exiting the aerial imaging element so as to re-enter the aerial imaging element, wherein the reflective member is arranged so as to reflect first entering light, received from the aerial imaging element, as second entering light, the first entering light emitted from a projected object and reflected by the aerial imaging element, and the second entering light directed by the reflective member toward the aerial imaging element to enter the aerial imaging element, and wherein the aerial imaging element is configured to:
reflect the first entering light so as to form a first real image in a first position that is in plane symmetry with the projected object with respect to a plane of the aerial imaging element, and reflect the second entering light so as to form a second real image in a second position that is in plane symmetry with a virtual image of the first real image formed by the reflective member with respect to the plane of the aerial imaging element.

2. The display device according to claim 1,
wherein the optical system includes an image display device that displays an image of the projected object,
wherein a display surface of the image display device is arranged so as to form a given inclination angle with respect to the plane in which the aerial imaging element is formed, and
wherein the image of the projected object displayed in the image display device is formed by rotating the second real image by 180 degrees.

3. The display device according to claim 2, further comprising:
an image processing device that outputs image data for representing the image of the projected object to the image display device,
wherein the image processing device is configured to:
generate image data by executing image processing for eliminating inversion in the first real image resulting from the reflective member, and
output the image data to the image display device.

4. The display device according to claim 3,
wherein a distance between the aerial imaging element and the reflective member and a distance between the aerial imaging element and the image display device are adjusted such that the virtual image formed in the optical system does not overlap the second real image.

5. The display device according to claim 4,
wherein the image display device is a display that displays a three-dimensional image.

6. A display device, comprising:
an optical system, including
an aerial imaging element comprised of a plurality of elements that each have two reflecting surfaces orthogonal with one another, said plurality of elements arranged in an array that extends along a plane, said plane being non-parallel to respective planes of the two reflecting surfaces, and
first and second reflective members having mirror surfaces that reflect light,
wherein the first reflective member is arranged so as to reflect first entering light from a projected object as second entering light, the second entering light directed by the first reflective member toward the aerial imaging element to enter the aerial imaging element,
wherein the second reflective member is arranged so as to reflect the second entering light that entered and was reflected by the aerial imaging element as third entering light, the third entering light directed by the second reflective member toward the aerial imaging element to enter the aerial imaging element, and
wherein the aerial imaging element is configured to:
reflect the second entering light so as to form a first real image in a first position that is in plane symmetry with a virtual image of the projected object formed by the first reflective member with respect to a plane of the aerial imaging element, and
reflect the third entering light so as to form a second real image in a second position that is in plane symmetry with a virtual image of the first real image formed by the second reflective member with respect to the plane of the aerial imaging element.

7. The display device according to claim 6,
wherein the projected object is projected on the first reflective member as an image formed by rotating the second real image by 180 degrees.

8. The display device according to claim 1, wherein the mirror surface is flat.

9. The display device according to claim 6, wherein the mirror surfaces are flat.

* * * * *